United States Patent [19]
Weigel

[11] 3,871,034
[45] Mar. 18, 1975

[54] FACE PLATE GASKET

[75] Inventor: Hugo K. Weigel, Sea Girt, N.J.

[73] Assignee: Jay R. Smith Mfg. Co., Piscataway, N.J.

[22] Filed: Jan. 15, 1973

[21] Appl. No.: 323,468

[52] U.S. Cl. .................... 4/252 R, 4/68, 277/187, 277/207, 277/212 F
[51] Int. Cl. ............................................ F16l 21/02
[58] Field of Search .... 277/235 B, 207, 211, 212 F, 277/215, 9, 11, 9.5, 165, 189, 208, 212 R; 285/379, 380; 4/170, 68, 252 R

[56] References Cited
UNITED STATES PATENTS

| | | | |
|---|---|---|---|
| 1,768,995 | 7/1930 | Oven | 277/11 |
| 2,405,120 | 8/1946 | Evans | 277/11 |
| 3,151,869 | 10/1964 | Butcher | 277/211 |
| 3,186,042 | 6/1965 | Daley | 277/11 |
| 3,228,039 | 1/1966 | Freeman | 277/207 |
| 3,349,412 | 10/1967 | Schwartz et al. | 277/208 |
| 3,360,283 | 12/1967 | Guthrie | 277/208 |

FOREIGN PATENTS OR APPLICATIONS
1,014,364   4/1963   Great Britain ..................... 277/211

Primary Examiner—Richard E. Aegerter
Assistant Examiner—John W. Shepperd
Attorney, Agent, or Firm—Irvin A. Lavine

[57] ABSTRACT

A face plate gasket for sealing the vertically extending joint between a plumbing fitting and an adjustable face plate on the fitting; the face plate receives a nipple, which connects to the water closet, and the face plate provides support to the wall hung closet. The gasket is made of a pliable, resilient semi-rigid material such as neoprene and has a peripheral flange in the vertical plane with multiple endless beads. It is supported in position during assembly by an integral lip extending into the conduit opening of the fitting, the lip having a bead on its free end of larger transverse dimension than the opening of the fitting, the lip having a lesser transverse dimension than the fitting conduit opening.

2 Claims, 3 Drawing Figures

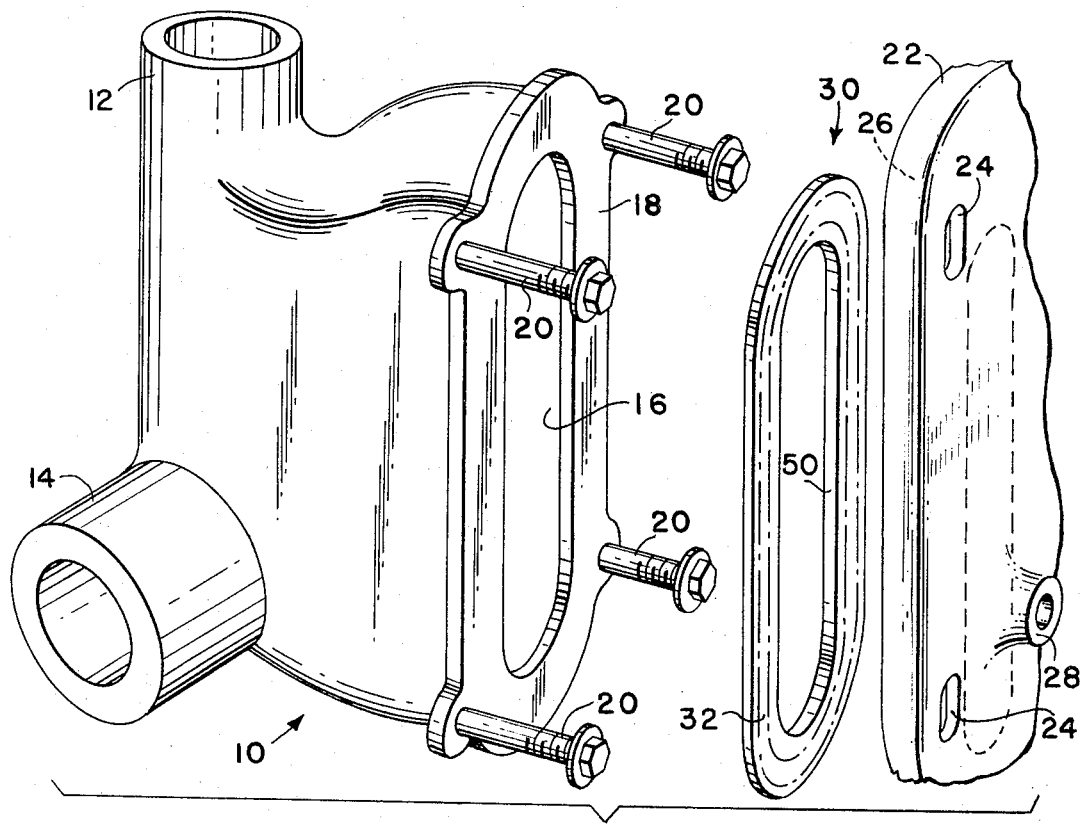
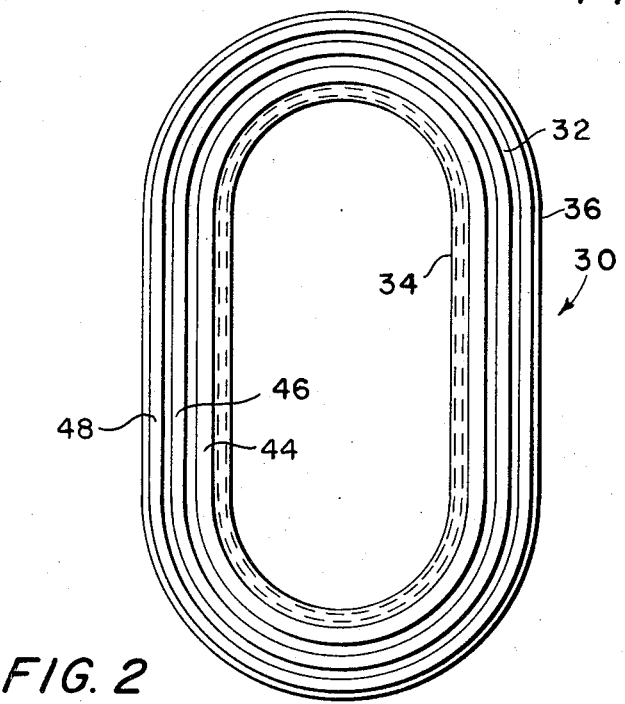
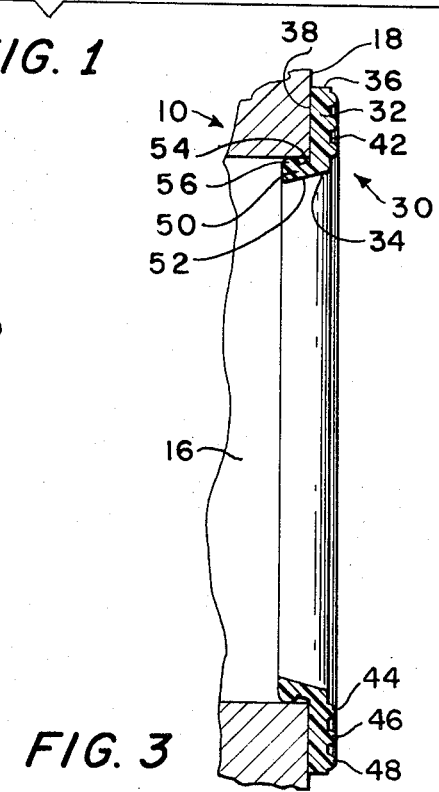

FACE PLATE GASKET

BACKGROUND OF THE INVENTION

The present invention relates to a gasket for sealing the joint between a plumbing fitting and a fixture, such as a water closet.

Water closets, or toilets, were for many years mounted on a floor; in which a suitable drain was provided. In more recent times, however, the water closet has been mounted on a wall, rather than on a floor. In such installations, a fitting was provided having a generally horizontal conduit opening, terminating in a flanged face lying in a vertical plane, which was generally parallel to the wall. This fitting was supported by the face plate and/or support members, the face plate was fastened to the fitting, the face plate having an opposed, mating face and a conduit opening. Typically, the conduit opening was of somewhat oval shape, having a height of approximately 8 inches and a width of approximately 4 inches. Several types of sealing devices have been provided for sealing the joint between the two faces, of the fitting and the fixture. A suitable bolt and nut arrangement were provided for holding the face plate to the fitting.

In order to make the joint water tight, a peripherally extending groove was provided in one or both of the faces, and a lead seal was placed in the groove of, for example, the fitting. Then the face plate was placed in position and the bolts tightened. However, the construction was found to be somewhat time consuming, and it was not always possible to maintain the lead sealing member in position in the groove, since the groove and the lead seal were essentially in a vertical plane. Adjustment was not always satisfactory, since lead would take a set and not conform to a new position.

Subsequently, in place of the lead seal, a rubber O-ring was utilized. The rubber O-ring suffered, however, from the same defects as the lead seal, at times becoming displaced during the assembly operation, and/or adjustment.

A further seal which was provided for this joint was a flat rubber gasket, generally in the shape of an endless band or ribbon, and the same difficulties and deficiencies were experienced with the flat rubber gasket, as with the rubber O-ring and the lead seal.

Among the objects of the present invention are to provide a face plate gasket which will establish a water tight seal, and which will provide for quick and easy assembly of a fitting to a fixture, and allow easy adjustment without adversely effecting the seal.

Another object of the present invention is the provision of a face plate gasket which will remain in position, without movement, during assembly of a fixture to a fitting, where the faces of the fitting and fixture are in vertical planes.

Yet another object of the present invention is to provide a face plate gasket permitting rigid, trouble-free assembly of a face plate to a fitting having a vertical sealing face.

Other objects of the present invention will be readily apparent from consideration of the following specification and drawings.

SUMMARY OF THE INVENTION

The present invention provides a face plate gasket which includes a structure for holding it in position in a vertical plane, adjacent the vertical peripheral sealing face of a fitting, so that a face plate may be joined to the fitting rapidly and without difficulty. The face plate gasket includes a peripherally extending flange, intended for placement in a vertical plane, the flange being relatively wide and thin, and having spaced inner and outer margins. Between the inner and outer margins are a pair of opposed sealing faces, and on one of these sealing faces there are a plurality of peripherally extending beads. These beads are endless, and are spaced apart, one lying inwardly of the other. Preferably, three such beads are provided, all extending from the same face of the flange of the gasket. At the inner margin of the peripheral flange there is provided a peripherally extending lip which is transverse to the plane of the flange. The lip has inner and outer surfaces, and is provided at its free end with a bead, positioned on the outer surface of the lip. This bead has a larger transverse dimension than that of the conduit opening of the fitting, while the outer surface of the lip has a smaller transverse dimension than the transverse dimension of the conduit opening of the fitting. The face plate gasket is made of a resilient, pliable, semi-rigid material, such as neoprene, so that when the lip and its bead are inserted into the conduit opening of the fitting, the lip is forced inwardly from its normal or unstressed position, and thereby reacts so as to provide a gripping action on the interior, peripherially extending surface of the conduit opening of the fitting. This enables the lip to support the gasket, and particularly the flange, in position adjacent the face of the fitting, thereby permitting the face plate to be installed and assembled to the fitting rapidly and effectively.

BRIEF DESCRIPTION OF THE DRAWING

FIG. 1 is an exploded perspective view of a fitting, a face plate gasket in accordance with the present invention, and a face plate, the latter being broken away.

FIG. 2 is an elevational view of the face plate gasket shown in FIG. 1.

FIG. 3 is a transverse cross-sectional view showing the gasket in position in the fitting.

DESCRIPTION OF THE PREFERRED EMBODIMENTS

Referring now to the drawing, wherein like or corresponding reference numerals are used for like or corresponding parts throughout the several views, there is shown in FIG. 1 a fitting generally designated 10 of known configuration, which is preferably of cast iron or the like. The fitting 10 is provided with a vent 12 and a waste 14, and further includes a conduit 16 which is generally of elongate configuration. The conduit 16 may have a width of approximately 4 inches, and a height of approximately 8 inches, and terminates in a sealing face 18 which lies in a substantially vertical plane. The fitting 10 is provided with a plurality of bolts 20 to permit assembly of a face plate 22 thereto, which is provided with suitable bolt slots 24. The face plate 22 includes a sealing face 26 which extends about a conduit 28. As will be understood, the face plate 22 is attached to the fitting 10, and the conduits 16 and 28 are in fluid communication with each other, in order to permit the passage of waste water from the fixture through face plate 22 into the fitting 10.

In order to seal the joint between the sealing faces 18 and 26, there is provided the gasket 30.

The face plate gasket 30 comprises a flange 32 which is peripherally extending, as shown in FIG. 1, and which is relatively wide in the radial sense, as shown in FIG. 2. The flange 32 may be seen in FIG. 3 to be axially thin. In practice, in a typical embodiment, between the inner margin 34 and outer margin 36 of the flange 32, it may have a width of approximately seven-eighths of an inch, and the thickness of the flange, between the sealing face 38 and the sealing face 42 may be approximately one-eighth inch.

On the sealing face 42 there are provided endless, peripherally extending beads 44, 46 and 48. These beads lie one within the other, and are spaced apart, as best shown in FIG. 3. Preferably, these beads have a width of approximately one-eight inch, and the spacing between them is approximately one-eight inch, and the beads have an extent away from the face 42 of approximately one-eighth inch.

In order to support the gasket 30, and more particularly the flange 32 in the vertical position as shown in FIG. 3, there is provided a lip 50 which is peripherally extending, which is transverse to the flange 32, and which extends from the inner margin 34 of the flange 32, and from the face 38 thereof. The lip 50 has an inner surface 52 and an outer surface 54. At its free end, remote from the flange 32, there is provided on the outer surface 54 of the lip 50 a bead 56.

The transverse extent of the bead 56 across the opening of the conduit 16 is somewhat larger than the transverse extent of the conduit 16, while the transverse extent or dimension of the outer surface 54 of the lip 50 is somewhat less than that of the conduit 16 when the gasket 30 is free of the fitting and is undistorted.

Consequently, when the face plate gasket 30 is placed in position in association with the fitting 10, there is a distortion of the lip 50, generally inwardly, shown in somewhat exaggerated fashion in FIG. 3.

The gasket 30 is an integrally molded structure, and is of a material which is pliable, resilient and of a semi-rigid nature. Preferably this is Neoprene. Consequently, due to the nature of the material, and due to the dimensions used, the lip 50 will have a reactive force against the wall which defines the conduit 16, and will thereby securely hold the gasket 30 in position, with the flange 32 in a substantially vertical plane, and with the sealing face 38 substantially in engagement with the sealing face 18 of the fitting 10. Thereafter, the face plate 22 may be placed in position, while the gasket 30 remains securely in place in the position as shown in FIG. 3. The sealing face 26 thereof will engage the beads 44, 46 and 48, and when the nuts on the bolts 20 are tightened, the flange 32 including the beads 44, 46 and 48 will be compressed, and as a result there will be provided a water tight joint between the fitting 10 and the fixture 22.

The gasket 30 herein disclosed compensates for any fins or build-up at the edge between the conduit 16 and the face 18, thereby permitting the manufacturer of the fitting 10 with somewhat relaxed tolerances and with somewhat lessened finishing work thereon. There thereby is reduced the cost of manufacture of the fitting 10, when the gasket 30 is used therewith. Further, the provision of the multiple beads on the face 42 of the flange 32 will enable the manufacture of the fitting 10 with a sealing face 18 having some imperfection and variations, thereby further contributing to the lowering of tolerances and the lessening of the cost of the fitting 10. Also, the workman, such as the plumber, assembling the fixture 22 to the fitting 10 may work with greater speed, since he is not required to exercise the great degree of care which was heretofore required with the assembly of such fixtures to the fitting. Further, the gasket 20 can be manufactured with reasonably relaxed standards, since minor imperfections therein will not cause the joint to leak.

It is further to be noted that the beads 44, 46 and 48 add to the strength and stability of the gasket 30, and particularly the flange 32, when it is in position, prior to assemblage of the fixture 22. Buckling of the gasket, or possible movement are avoided.

There has been provided a face plate gasket for use in connection with the joint between the preferably vertical sealing face plates of a fitting and a plate, which face plate gasket permits rapid assemblage of the fixture and the fitting, and which assures a water tight seal. The face plate gasket herein provided will be held in position during assembly operation, and installation adjustments without buckling, and without movement which would affect the integrity of the joint which is formed. Further, the herein disclosed face plate gasket may be economically manufactured of readily available material, and will permit reduction in cost of manufacture of the fitting, as well as result in saving of time of the assembly of the fixture to the fitting.

It will be obvious to those skilled in the art that various changes may be made without departing from the spirit of the invention and therefore the invention is not limited to what is shown in the drawings and described in the specification but only as indicated in the appended claims.

I claim:

1. In combination, a plumbing fitting having a substantially horizontal conduit terminating in a substantially vertical peripheral face transverse to said conduit, and a face-plate gasket of pliable resilient material for sealing a joint between said face of said fitting and a face plate to be positioned in adjacent communicating relationship with said fitting, said gasket comprising a peripherally extending radially relatively wide and axially thin flange generally parallel to said peripheral face of said fitting and adjacent thereto, said flange having spaced inner and outter margins having opposed sealing faces between them, with one said sealing face being adjacent said substantially vertical peripheral face of the fitting and said other face being adapted to be engaged by a face plate, a plurality of radially spaced apart, endless, peripherally extending beads extending from one said flange face, and generally horizontally extending support means integral with and extending transversely of said flange at said inner margin thereof, said integral support means comprising a peripherally extending lip having inner and outer surfaces, a bead on the outer surface of said lip remote from said flange, said bead engaging said conduit and distorting said lip from an initial position prior to insertion in which said lip extends generally perpendicularly to the plane of said flange of a second inserted position in which said lip is squeezed inwardly by said conduit to thereby produce a reactive force against the conduit wall, whereby said gasket is supported with the flange in a substantially vertical plane by said integral lip.

2. The face plate gasket of claim 1, said gasket being of Neoprene.

* * * * *